Patented Nov. 10, 1936

2,060,422

UNITED STATES PATENT OFFICE 2,060,422

MEAT TREATING METHOD

Harry Henry McKee and Grover Ralph Henney, Chicago, Ill., assignors to Swift and Company, Chicago, Ill., a corporation of Illinois No Drawing. Application November 14, 1930, Serial No. 495,783

4 Claims. (Cl. 99—107)

This invention relates to improved fresh meat products and to the method by which they are prepared. The meat products of this invention are particularly characterized by a superior bright red or pink color which is highly desirable for fresh meats from the marketing standpoint, while possessing all of the usual good qualities as to texture, flavor, etc., characteristic of the best grades of fresh meat prepared by the old and well known methods.

In retailing fresh meat products, it has been found that the color thereof has a marked effect on the customer, whereby the customer will invariably select a particular piece or cut which possesses the brightest or most vivid red color. This tendency is so marked that it often happens that pieces or cuts of meat which are actually inferior in quality will be demanded over pieces of the highest grade. Due to this fact, some degree of attention has been paid to the color of meat products and efforts made to improve the color thereof, so as to produce if possible, a brighter red color.

In some instances, it has become the practice to treat the meats with sulfites which are known to brighten and increase the redness thereof. This of course, is not preferable, but it is found to serve well in convincing the customer that he is actually obtaining high grade meat which might otherwise be rejected as not wanted. The use of sulfites is not universally practiced but of course, in any case, the elimination of the need for its use would constitute a marked advance and improvement.

There is little scientific information on the cause for color changes of meats but notwithstanding, the applicants have made certain discoveries relative to the preparation thereof which have been found to be highly successful in improving the color of fresh meats, without the use of chemicals or adulterants of any kind and without in any way impairing the otherwise good qualities thereof.

It is therefore an object of this invention to provide fresh meat products which exhibit a brighter and more desirable red or pink color while possessing the other good qualities of meats prepared in the usual method.

It is a further object of this invention to provide a method by which said improved meat products may be prepared.

It is a further object to provide frozen meat products which possess bright red color much superior to the color of frozen or unfrozen products not so prepared.

These and other objects are contemplated for this invention as will readily appear to one skilled in the art as the following description proceeds.

By way of example, preferred methods of practicing the invention will now be described which are not to be considered as limiting the invention in any respect as the scope thereof should be determined from an understanding of the disclosed examples and an appreciation of the advantages which the invention produces therein.

The bright red color which meats possess is lost to some degree by the chilling process employed for the removal of animal heat after slaughtering, with the result that fresh meat products emerge from the chilling treatment with a dark, rather undesirable color.

It is also found that the color of meats is materially darkened when frozen in the usual commercial methods.

When fresh beef is chilled in the ordinary way it takes on a dark rather undesirable color and if the product is frozen slowly this color remains. On the other hand, if the product is quickly frozen a light bright red is noticeable. If frozen beef is sliced and subjected to comparatively low mechanical pressure either by slapping with a board or other flat instrument or placing in a press, the product takes on a bright light red color, more bright than can be secured by quick freezing alone, and the color thus obtained may be obtained with equal success whether or not the product has been slowly frozen or quickly frozen. It is necessary, however, that the product be frozen at the time the pressure is applied, and it is then interesting to note that the color remains even after defrosting.

We found by experiment that a desirable color is obtainable regardless of whether pressure is applied slowly or quickly by impact blows or otherwise. We found that where beef cut up in small pieces of two to four cubic inches in form is frozen slowly the color is slightly darker than if frozen quickly. However, after comminuting by running through the meat hasher the product takes on a bright light red desirable color, and so far as color is concerned, it seems to make no difference whether the meat has been slowly or quickly frozen.

In experimental work, we have applied pressure by impact blows, and progressively, and found the results the same.

We found that very excellent results are secured if the product is at a temperature ranging from 25 degrees to 32 degrees Fahrenheit at the time the pressure is applied.

In the case of pork, the lean meat takes on a bright pink color extremely desirable from a sales standpoint. Hamburger prepared from beef trimmings will show the same bright red color if the grinding is done while the product is kept at a temperature of at or below freezing. The lean meat present in the pork trimmings for the manufacture of pork sausage becomes light pink in color if the product is ground while the lean meat is frozen. This discovery is of considerable importance in the fresh pork sausage industry. A fresh pork sausage product whether in patty form or link form is much more desirable from a consumer's standpoint, because of its appetizing appearance, if the lean meat exhibits a light red or pink rather than a gray appearance. As before stated, it has been common practice in the past in many states where the law permits it, to use sulphites to bring out this color. By our invention, this color may be obtained without the addition of any deleterious substance, even in negligible quantities. Various chemicals have been used from time to time in the fresh meat industry, especially by retailers, to give meats a bright red, rather than the familiar dark forbidding color of fresh beef, or the forbidding gray of fresh pork.

By our invention, this color may be secured in any fresh meat by merely freezing the product either quickly or slowly and then subjecting to pressure. The pressure may be applied by blunt means or by the action of hashers or other comminutors.

We claim:

1. The method of treating meat which consists in first freezing the meat and then subjecting it to mechanical pressure while frozen at a temperature of from 25° to 32° Fahrenheit to impart a lighter brighter color.

2. The method of treating meat which consists in first freezing the meat and thereafter submitting to mechanical pressure while in a frozen condition at a temperature of from 25° to 32° Fahrenheit to impart a light red color.

3. The method of treating meat which consists in first freezing the product and then comminuting while frozen at a temperature of from 25° to 32° Fahrenheit to impart a light red color.

4. The method of producing fresh pork sausage meats having lean of a light red color without the addition of adulterant which consists in freezing the lean meat and thereafter comminuting the lean meat while it is in a frozen condition at a temperature of from 25° to 32° Fahrenheit.

HARRY HENRY McKEE.
GROVER RALPH HENNEY.